United States Patent [19]

Seit

[11] Patent Number: 5,121,906
[45] Date of Patent: Jun. 16, 1992

[54] END DAMPER FOR MOTOR-VEHICLE SHOCK ABSORBER

[75] Inventor: Horst Seit, Moorenweis, Fed. Rep. of Germany

[73] Assignee: Krauss Maffei Aktiengesellschaft, Munich, Fed. Rep. of Germany

[21] Appl. No.: 596,773

[22] Filed: Oct. 12, 1990

[30] Foreign Application Priority Data

Oct. 19, 1989 [DE] Fed. Rep. of Germany ....... 3934896

[51] Int. Cl.$^5$ .............................................. B60G 15/06
[52] U.S. Cl. ..................................... 267/221; 280/698
[58] Field of Search ............... 188/284, 297, 298, 314, 188/315, 322.12; 267/64.26, 122, 217, 220, 221; 280/696, 698

[56] References Cited

U.S. PATENT DOCUMENTS

| | | |
|---|---|---|
| 2,853,974 | 9/1958 | Hewitt . |
| 2,907,414 | 10/1959 | Patriquin . |
| 3,603,610 | 9/1971 | Thompson .......................... 267/221 |
| 4,397,452 | 8/1983 | Fouts .................................. 267/221 |

FOREIGN PATENT DOCUMENTS

| | | |
|---|---|---|
| 2445240 | 4/1982 | Fed. Rep. of Germany . |
| 3328300 | 7/1985 | Fed. Rep. of Germany . |
| 969377 | 5/1988 | Fed. Rep. of Germany . |
| 5993540 | 11/1982 | Japan . |
| 6264603 | 9/1985 | Japan . |
| 6264604 | 9/1985 | Japan . |
| 1085157 | 9/1967 | United Kingdom . |

OTHER PUBLICATIONS

Patent Abstracts of Japan, M-618, Aug. 21, 1987, vol. 11, No. 258, JP 62 64603 A., JP 62 64604 A:, & JP 62 64605A.

Primary Examiner—Robert J. Oberleitner
Assistant Examiner—Chris Schwartz
Attorney, Agent, or Firm—Herbert Dubno

[57] ABSTRACT

An end damper is used with a motor vehicle frame, a wheel vertically displaceable adjacent the frame, and a vertically compressible shock absorber having an upper part secured to the frame and a lower part secured to the wheel. The absorber is vertically compressible with upward travel of the lower part. The end damper is carried on the frame above the lower part and comprises a housing defining a chamber, a body of liquid in the chamber, an upper sleeve in the chamber and connected to the frame, and a lower sleeve vertically telescopable with the upper sleeve between an upper position and a lower position, subdividing the chamber with the upper sleeve into a pair of compartments communicating through the gap, and defining with the upper sleeve an annular passage communicating between the compartments and of substantially greater length in the upper position than in the lower position. A spring braced between the sleeves urges the lower sleeve into the lower position. A conduit extends between the compartments and a check valve in the conduit permits flow through the conduit on travel of the lower sleeve from the upper to the lower position.

8 Claims, 2 Drawing Sheets

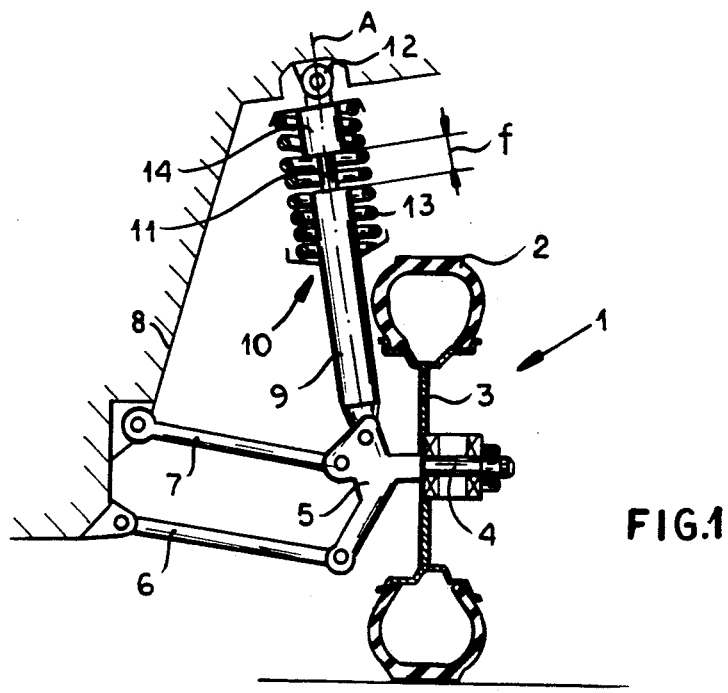
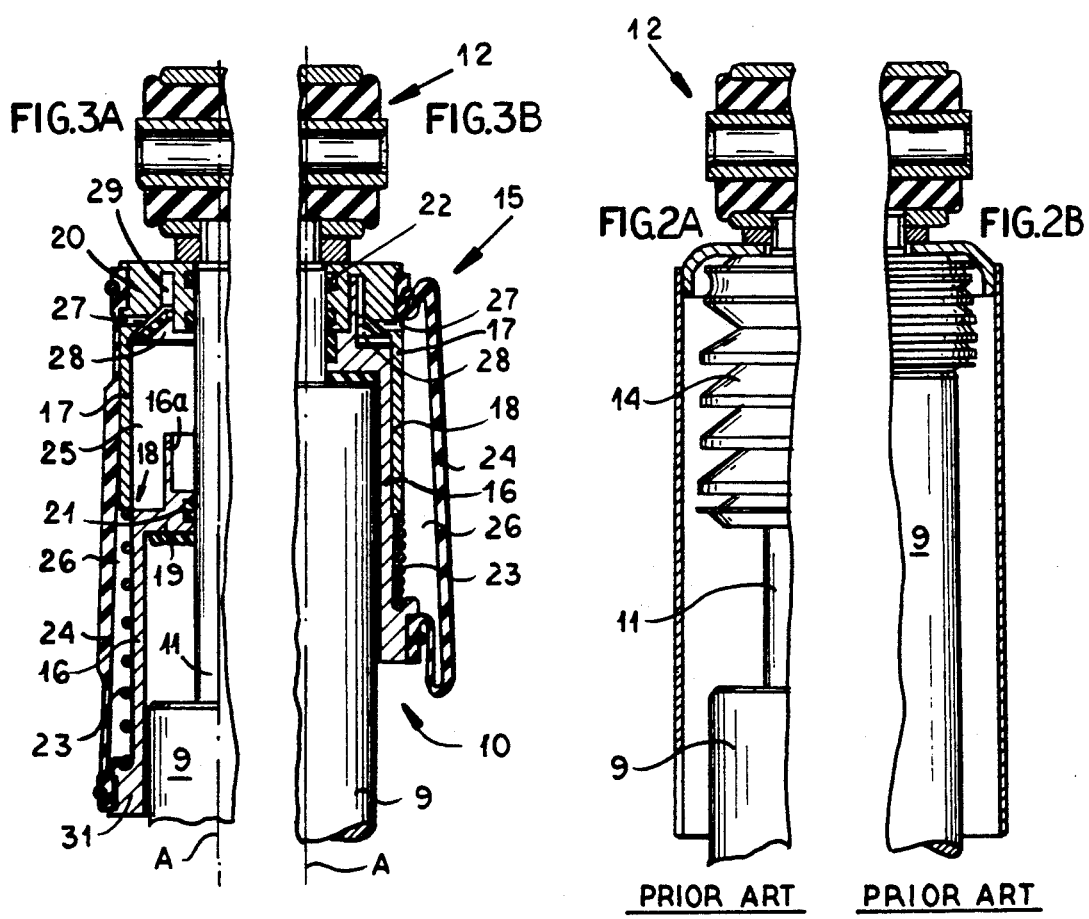

ABSORBER

FIELD OF THE INVENTION

The present invention relates to a motor-vehicle shock absorber. More particularly this invention concerns an end damper for such a shock absorber.

BACKGROUND OF THE INVENTION

A motor-vehicle wheel is typically mounted so that it can move vertically relative to the frame of the vehicle, and a spring urges the wheel downward. A shock absorber is braced vertically between the wheel and the vehicle frame and comprises a piston having a piston rod normally pivoted on the frame and a cylinder pivoted on the wheel. The piston defines in the cylinder a pair of liquid-filled compartments and an orifice is provided for fluid flow past the piston between the compartments. Thus vertical movement of the wheel is damped in that liquid flow between the compartments is throttled so that the shock absorber prevents the wheel from moving relative to the frame at too great a speed. This damping improves the ride of the vehicle.

It is considered desirable to increase the damping effect at the upper limit of travel of the wheel relative to the vehicle frame, so that as the wheel is being moved up to a point where its spring and the shock absorber will bottom, transmitting force directly from the wheel to the frame, such upward displacement will be resisted with increasing force. This can be done simply by putting a rubber bumper at one end of the shock absorber as described in British patent 1,085,157 of D. Gladstone. Such an arrangement has the considerable disadvantage that the force/stroke curve increases regularly so that extreme jolts are transmitted to the vehicle frame, and the stored-up energy is retransmitted back to the wheel suspension later. In both cases this can damage the suspension.

It is also known to provide an end damper that somewhat overcomes this problem as described in German patent document 2,445,250 filed Sept. 21, 1974 by W. Zenz by providing a second piston and spring in the shock absorber, or by changing the flow cross section of the passage communicating between the compartments of the shock absorber as described in German patent 969,377 of B. Barenyi. Other more complex arrangements are seen in U.S. Pat. No. 3,036,669 of H. Schultze, German patent document 3,328,300 of J. Hardt (based on a Swiss priority of Jul. 20, 1983), and Japanese patents 62-64603 and 62-64604 both of Y. Kubot.

None of these more complex hydraulic arrangements provides a flat force/stroke curve. Thus there remains a potential of damage to the wheel suspension structure.

OBJECTS OF THE INVENTION

It is therefore an object of the present invention to provide an improved end damper for a motor-vehicle shock absorber.

Another object is the provision of such an improved end damper for a motor-vehicle shock absorber which overcomes the above-given disadvantages, that is which provides a flat force/stroke curve so as to protect the wheel suspension.

SUMMARY OF THE INVENTION

The instant invention is an end damper used with a motor vehicle frame, a wheel vertically displaceable adjacent the frame, and a vertically compressible shock absorber having an upper part secured to the frame and a lower part secured to the wheel. The absorber is vertically compressible with upward travel of the lower part. The end damper is carried on the frame above the lower part and comprises a housing defining a chamber, a body of liquid in the chamber, an upper sleeve in the chamber and connected to the frame, and a lower sleeve vertically telescopable with the upper sleeve between an upper position and a lower position, subdividing the chamber with the upper sleeve into a pair of compartments communicating through the gap, and defining with the upper sleeve an annular passage communicating between the compartments and of substantially greater length in the upper position than in the lower position.

Thus with the system of this invention the curve of the force dissipated by the damper on the ordinate and the stroke of the damper on the abscissa is a straight line or, more accurately, a square wave starting at the point when the two sleeves start to move relative to each other and ending when no further movement is possible. The response is dependent on speed.

According to further features of this invention a spring braced between the sleeves urges the lower sleeve into the lower position. A conduit extends between the compartments and a check valve in the conduit permits flow only through the conduit on travel of the lower sleeve from the upper to the lower position. As a result when the shock absorber moves back down out of contact with the lower sleeve, the spring restores the parts to their starting position with the lower sleeve down by sucking air into the inner chamber through the conduit and past the check valve. The force expended on upward displacement is transformed into heat and is not stored up and transmitted back to the parts of the suspension.

The housing itself is a flexible sleeve having an upper end connected to the upper sleeve and a lower end connected to the lower sleeve. This sleeve is an elastomeric cuff.

In accordance with another feature of this invention one of the parts is formed with a laterally closed cup open in the chamber toward the other part and the other part is formed with a laterally closed recess into which the cup fits with play. This increases the resistance force substantially in the terminal portions of the stroke, offering further protection against the damper bottoming.

BRIEF DESCRIPTION OF THE DRAWING

The above and other objects, features, and advantages will become more readily apparent from the following, reference being made to the accompanying drawing in which:

FIG. 1 is a mainly schematic side view of a motor-vehicle wheel assembly;

FIGS. 2A and 2B are vertical sections through a prior-art end damper in the uncompressed and compressed positions, respectively;

FIGS. 3A and 3B are vertical sections through the end damper according to this invention in the uncompressed and compressed positions, respectively.

SPECIFIC DESCRIPTION

Figure 4:
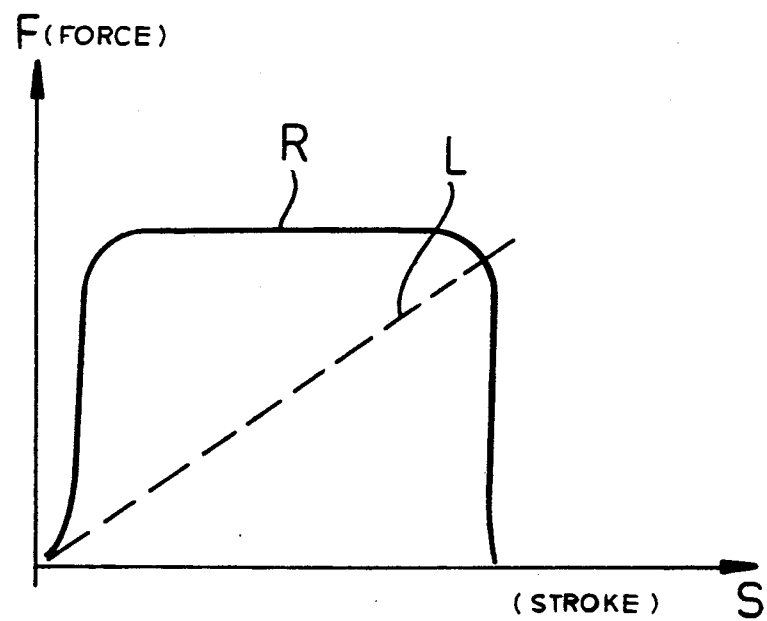
FIGS. 4 and 5 are diagrams illustrating the instant invention.

As seen in FIG. 1 a motor-vehicle wheel 1 comprising a tire 2 and a rim 3 is pivotal about a horizontal axis on an axle 4 carried on a bracket 5 supported by link arms 6 and 7 on a motor-vehicle frame 8. A standard hydraulic shock absorber 10 centered on an axis A has a cylinder 9 pivoted on the bracket 5 and a piston rod 11 pivoted at 12 on the frame 8 above the bracket 5, and a coil-type compression spring 11 surrounds the upper part of the absorber 10, braced between its cylinder 9 and the frame 8.

Figure 5:
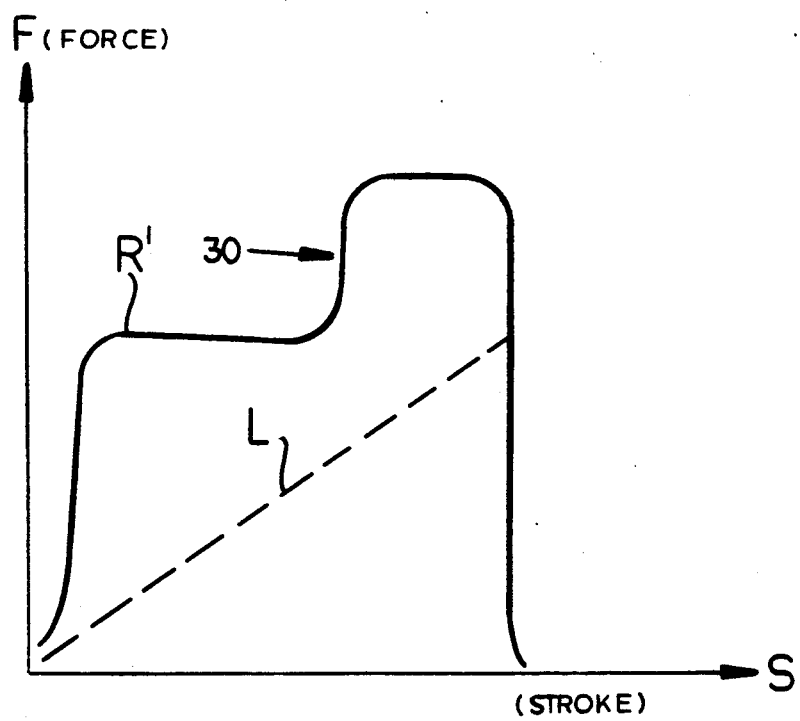

As also shown in FIGS. 2A and 2B an end damper 14 comprised of a stack of compressible washers is provided at the upper end of the piston rod 11 so that it can engage the upper end of the cylinder 9 after same is pushed up through a stroke f. The standard prior-art such end damper produces as seen in FIGS. 4 and 5 a response curve L of force F plotted against travel or stroke S which is a straight line rising at an angle to the abscissa. Thus the prior-art device 14 resists compression with an increasing force so that, at the end of its compression, it transmits a considerable force to the frame 8. In addition in the prior-art system 14 this force is mainly stored up and is reapplied to the system when the force urging the wheel 1 up is relieved.

According to this invention as seen in FIGS. 3A and 3B an end damper 15 is provided which comprises a lower sleeve 16 and an upper sleeve 17 that telescope along the axis A in each other and that define an annular gap or passage 18 between each other. The sleeves 16 and 17 have upper ends 19 and 20, respectively, and fit around the piston rod 11, with respective seals 21 and 22 provided engaging this rod 11 A relatively weak compression spring 23 is provided between the sleeves 16 and 17 to urge them axially apart into the FIG. 3A position.

An elastomeric sleeve or cuff 24 has an upper end secured to the upper end 20 of the upper sleeve 17 and a lower end secured to a lower end 31 of the lower sleeve 16. The two sleeves 16 and 17 define, therefore, an inner compartment 25 and the sleeve 16 and cuff 24 define an outer compartment 26, with the gap 18 providing fluid communication between these two compartments 25 and 26. In addition the upper end 20 of the upper sleeve 17 is formed with a radially throughgoing passage or conduit 27 extending between the compartments 25 and 26 and provided at its inner end with a flap-type check valve 28 that prevents flow from the compartment 25 to the compartment 26 but freely permits opposite flow.

Thus as the cylinder 9 rises through stroke f and abuts the bottom of the upper wall 19 of the sleeve 16, it forces this sleeve 16 up in the sleeve 17, thereby decreasing the volume of the compartment 25. Flow past the valve 28 is impossible, so the only way for the liquid in the compartment 25 to escape is via the gap or passage 18. This throttled outflow ensures that upward displacement of the cylinder 9 will be resisted by fairly constant force as indicated by curve R in FIG. 4. The length of the passage 18 increases as the lower sleeve 16 moves up, making the response speed-dependent.

According to this invention the upper wall 19 of the lower sleeve 16 is formed with an upwardly projecting cup or rim 16a and the upper wall 20 of the upper sleeve 17 is formed with a downwardly open annular groove 29 into which this rim 16a can fit with some play, both inside and outside. Thus near the end of the upward travel of the sleeve 16 in the sleeve 17, the rim 16a will engage in the groove 29. Liquid trapped within the cup of the rim 16a will therefore be trapped and will have to flow up in the groove 29, over the edge of the rim 16a, and then down in the groove 29. The result is an increased throttling force producing a response curve R' that is stepped upward at 30 as shown in FIG. 5 when the rim 16a engages in the groove 29. Once again the flow path of the escaping throttled flow is increased in length as the travel increases.

I claim:

1. In combination with
   a motor vehicle frame;
   a wheel vertically displaceable adjacent the frame; and
   a vertically compressible shock absorber having an upper part secured to the frame and a lower part secured to the wheel, the absorber being vertically compressible with upward travel of the lower part,
   a shock-absorber end damper carried on the frame above the lower part, the end damper comprising:
   a housing defining a chamber;
   a body of liquid generally filling the chamber;
   an upper element in the chamber and connected to the frame; and
   a lower element vertically displaceable relative to the upper element between an upper position and a lower position, subdividing the chamber with the upper element into a pair of liquid-filled compartments, and defining with the upper element a flow passage extending between the compartments, forming a path for fluid flow between the compartments on movement of the lower element from the lower to the upper position, and of substantially greater length and resistance to flow in the upper position than in the lower position, whereby, as the length of the passage increases, resistance to flow through it also increases, thereby increasing resistance to upward displacement of the lower element.

2. The shock-absorber end damper defined in claim 1, further comprising
   a spring braced between the upper and lower elements and urging the lower element into the lower position.

3. The shock-absorber end damper defined in claim 2, further comprising
   a conduit extending between the compartments; and
   a check valve in the conduit permitting flow through the conduit on travel of the lower element from the upper to the lower position.

4. The shock-absorber end damper defined in claim 1 wherein the upper and lower elements are upper and lower sleeves that telescope and that define an annular gap forming the passage.

5. The shock-absorber end damper defined in claim 4 wherein the housing is a flexible sleeve having an upper end connected to the upper sleeve and lower end connected to the lower sleeve.

6. The shock-absorber end damper defined in claim 5 wherein the flexible sleeve is an elastomeric cuff.

7. The shock-absorber end damper defined in claim 1 wherein one of the elements is formed with a laterally closed cup open in the chamber toward the other element and the other element is formed with a laterally closed recess into which the cup fits with play.

8. In combination with
   a motor vehicle frame;

a wheel vertically displaceable adjacent the frame; and a vertically compressible shock absorber having an upper part secured to the frame and a lower part secured to the wheel, the absorber being vertically compressible with upward travel of the lower part, an end damper carried on the frame above the lower part, the end damper comprising:

a housing defining a chamber;

a body of liquid generally filling the chamber;

an upper sleeve int eh chamber and connected to the frame;

a lower sleeve vertically telescopable with the upper sleeve between an upper position and a lower position, subdividing the chamber with the upper sleeve into a pair of liquid-filled compartments, and defining with the upper sleeve an annular flow passage extending between the compartments, forming a path for fluid flow between the compartments on movement of the lower sleeve from the lower to the upper position, and of substantially greater length and resistance to flow in the upper position than in the lower position, whereby, as the length of the passage increases, resistance to flow through it also increases, thereby increasing resistance to upward displacement of the lower element;

a spring braced between the sleeves and urging the lower sleeve into the lower position;

a conduit extending between the compartments; and a check valve in the conduit permitting flow through the conduit on travel of the lower sleeve from the upper to the lower position.

* * * * *